US010161379B2

(12) United States Patent
Nanehkaran

(10) Patent No.: US 10,161,379 B2
(45) Date of Patent: Dec. 25, 2018

(54) COASTAL PROTECTION AND WAVE ENERGY GENERATION SYSTEM

(71) Applicant: OCEANLINX LTD., New South Wales (AU)

(72) Inventor: Ali Mohammad Baghaei Nanehkaran, Wahroonga (AU)

(*) Notice: Subject to any disclaimer, the term of this patent is extended or adjusted under 35 U.S.C. 154(b) by 0 days.

(21) Appl. No.: 15/029,739

(22) PCT Filed: Oct. 16, 2014

(86) PCT No.: PCT/AU2014/000984
§ 371 (c)(1),
(2) Date: Apr. 15, 2016

(87) PCT Pub. No.: WO2015/054734
PCT Pub. Date: Apr. 23, 2015

(65) Prior Publication Data
US 2016/0273512 A1    Sep. 22, 2016

(30) Foreign Application Priority Data

Oct. 16, 2013    (AU) ................................ 2013903984

(51) Int. Cl.
*E02B 9/08* (2006.01)
*F03B 13/14* (2006.01)
(Continued)

(52) U.S. Cl.
CPC ............. *F03B 13/142* (2013.01); *E02B 9/08* (2013.01); *E02B 3/06* (2013.01); *E02B 3/10* (2013.01);
(Continued)

(58) Field of Classification Search
CPC ........ Y02E 10/32; F03B 13/14; F03B 13/142; E02B 9/08
(Continued)

(56) References Cited

U.S. PATENT DOCUMENTS 3,064,137 A * 11/1962 Corbett, Jr. ........... F03B 13/142
290/42
4,086,775 A    5/1978 Peterson, Jr.
(Continued)

FOREIGN PATENT DOCUMENTS

CN    202187316 U    4/2012
CN    202214706 U    5/2012
(Continued)

*Primary Examiner* — Frederick L Lagman
(74) *Attorney, Agent, or Firm* — Bradley D. Crose; Crose Law LLC

(57) ABSTRACT

This invention relates to a wave energy generator for a coastal protection system. The wave energy generator includes a base structure arranged in a body of water and configured to protect a portion of a coastline against incoming waves. The base structure has a foundation located on a floor of the body of water and a wall extending from the foundation to a point above a highest predicted height of the waves. At least one duct is associated with the base structure for receiving an oscillating water column from the body of water. The oscillating water column oscillates in response to wave action of the incoming waves and the duct forms part of an energy extraction system for capturing energy from the incoming waves.

20 Claims, 9 Drawing Sheets

(51) Int. Cl.
*E02B 3/06* (2006.01)
*E02B 3/10* (2006.01)

(52) U.S. Cl.
CPC .............. *Y02A 10/15* (2018.01); *Y02E 10/32* (2013.01); *Y02E 10/38* (2013.01)

(58) Field of Classification Search
USPC .............................................. 405/76, 77, 78
See application file for complete search history.

(56) References Cited

U.S. PATENT DOCUMENTS

| | | | | |
|---|---|---|---|---|
| 4,189,918 | A * | 2/1980 | Moody | F03B 13/142 |
| | | | | 290/53 |
| 4,198,821 | A * | 4/1980 | Moody | F03B 13/142 |
| | | | | 290/53 |
| 4,263,516 | A | 4/1981 | Papadakis | |
| 4,490,621 | A | 12/1984 | Watabe et al. | |
| 4,564,312 | A * | 1/1986 | Munoz Saiz | E02B 9/08 |
| | | | | 405/31 |
| 4,741,157 | A * | 5/1988 | Nishikawa | F03B 13/142 |
| | | | | 290/53 |
| 4,776,772 | A | 10/1988 | Everett | |
| 4,858,434 | A * | 8/1989 | Masuda | F03B 13/142 |
| | | | | 60/398 |
| 5,027,000 | A * | 6/1991 | Chino | F03B 13/142 |
| | | | | 290/42 |
| 5,461,862 | A * | 10/1995 | Ovadia | F03B 13/142 |
| | | | | 60/502 |
| 5,575,587 | A * | 11/1996 | Chen | E02B 9/08 |
| | | | | 405/76 |
| 6,194,791 | B1 * | 2/2001 | Wells | F03B 13/142 |
| | | | | 290/42 |
| 2005/0207844 | A1 * | 9/2005 | Boccotti | F03B 13/142 |
| | | | | 405/21 |
| 2008/0175667 | A1 * | 7/2008 | Liou | E02B 3/06 |
| | | | | 405/25 |
| 2009/0309365 | A1 * | 12/2009 | Sauer | F03B 13/12 |
| | | | | 290/53 |
| 2011/0139299 | A1 * | 6/2011 | Dederick | F03B 13/142 |
| | | | | 141/98 |
| 2011/0225965 | A1 * | 9/2011 | Van Niekerk | F03B 13/142 |
| | | | | 60/497 |
| 2011/0291417 | A1 * | 12/2011 | Han | F03B 13/145 |
| | | | | 290/53 |
| 2012/0237298 | A1 * | 9/2012 | Cook | E02B 9/08 |
| | | | | 405/76 |
| 2012/0248776 | A1 * | 10/2012 | Nanehkaran | F03B 13/142 |
| | | | | 290/53 |
| 2012/0263537 | A1 * | 10/2012 | Thornton | F03B 13/142 |
| | | | | 405/76 |
| 2013/0255246 | A1 | 10/2013 | Murdoch | |
| 2014/0183122 | A1 * | 7/2014 | Canals | E02B 9/08 |
| | | | | 210/251 |

FOREIGN PATENT DOCUMENTS

| | | | | |
|---|---|---|---|---|
| DE | 3437093 A1 * | 6/1985 | ............ | F03B 13/142 |
| EP | 2944801 A1 * | 11/2015 | ............ | F03B 13/142 |
| GB | 2161544 A * | 1/1986 | ............ | F03B 13/142 |
| GB | 2239293 A | 6/1991 | | |
| GB | 2250321 A * | 6/1992 | .............. | E02B 9/08 |
| JP | S59028070 | 2/1984 | | |
| JP | 60215907 A * | 10/1985 | | |
| JP | 61190172 A * | 8/1986 | | |
| JP | S62118065 A | 5/1987 | | |
| JP | 07-252816 | 10/1995 | | |
| JP | 2011085003 A | 4/2011 | | |
| KR | 20-020298307 | 8/2002 | | |
| KR | 20030050834 A | 6/2003 | | |
| KR | 100748369 B1 | 8/2007 | | |
| KR | 20090079572 A | 7/2009 | | |
| KR | 100928569 B1 | 11/2009 | | |
| KR | 20100066028 A | 6/2010 | | |
| WO | 9510706 A1 | 4/1995 | | |
| WO | 04003379 A1 | 1/2004 | | |
| WO | 06037983 A2 | 4/2006 | | |
| WO | 10067177 A2 | 6/2010 | | |
| WO | WO-2011162615 A2 | 12/2011 | | |
| WO | WO-2013034636 A1 | 3/2013 | | |

* cited by examiner

COASTAL PROTECTION AND WAVE ENERGY GENERATION SYSTEM

CROSS-REFERENCE TO RELATED APPLICATIONS

This application is a National Stage of International Application No. PCT/AU2014/000984, filed Oct. 16, 2014, which claims the benefit and priority of Australian Application No. 2013903984, filed Oct. 16, 2013. The entire disclosures of the above applications are incorporated herein by reference.

FIELD OF THE INVENTION

This invention relates to coastal management solutions and sustainable energy generation. More particularly, the present invention relates to improvements in coastal management solutions and ocean wave energy extraction and to systems and methods therefor.

BACKGROUND TO THE INVENTION

Any discussion of the prior art throughout the specification should in no way be considered as an admission that such prior art is widely known or forms part of common general knowledge in the field.

Environmental concerns and the awareness of the finite resources of traditional combustible hydrocarbon fuel sources has lead to research into sustainable non-polluting energy sources such as waves, wind, tidal, geothermal and solar.

Numerous different types of wave power generation systems have been proposed. One system employs the basic principle of using the vertical motion inherent in the movement of waves to effect a rotary movement of a turbine to drive directly or indirectly a generator to produce electricity. In such systems, there is frequently reversing air flow conditions present, caused by the oscillatory motion of the waves. A number of specially configured unidirectional turbines have been designed to allow the turbine to continue operating in response to such reversing air flow conditions.

However, many, if not all, of these prior systems operate at a relatively low efficiency due to losses in the system when converting the oscillatory motion of the waves into rotational mechanical energy.

In addition, many prior wave power generation systems are heavily reliant upon the direction of travel of the prevailing ocean wave. Furthermore, many existing wave power generation systems are moored to constantly face in one direction and therefore operate below optimum efficiency for long periods due to changes in wave direction arising from natural tidal changes.

Another disadvantage of many known wave power generation systems operating on the basic principle of using the vertical motion of waves to effect rotary movement of a turbine which in turn drives a generator to produce electricity is that these systems commonly rely on the principle of gravity-induced resonant amplification to ensure efficiency of operation to attain the desired levels of power output. In such systems, it is necessary to convert the oscillatory motion of the water to an airflow. That is, many currently known systems typically require a hydraulic to pneumatic conversion process, further reducing the efficiency of the total energy conversion process.

In addition, many known wave power generation systems must be built to withstand the large and unpredictable forces to which they are subjected from ocean waves. To ensure the sustainability of a system over its working life a level of redundancy is required to be built into the system. For example, ocean power generating systems are commonly required to withstand the forces associated with the large waves of "once in a hundred year storms". The magnitude of the forces in these extreme cases is many times that of the forces arising in most storms and, as such, significant additional costs are necessarily incurred when manufacturing, installing and maintaining the system. It has been found that these additional costs are often so high that they can render systems commercial unviable.

Systems built to withstand the most extreme forces are necessarily larger in size and, consequently, the visual appeal of these systems is reduced. The visual appeal or aesthetics of sustainable energy systems such as ocean wave energy extraction systems is an important factor, not only for reducing the visual impact on the surrounding environment, but also for gaining public acceptance of these alternative means of producing energy.

It is an object of the present invention to overcome or ameliorate one or more of the disadvantages of the prior art, or at least provide a useful alternative.

SUMMARY OF THE INVENTION

According to a first aspect of the invention, there is provided a wave energy generator for a coastal protection system, including:

a base structure adapted to be arranged in a body of water so as to protect a coastline against incoming waves, the base structure having a foundation locatable on a floor of the body of water and a wall extending from the foundation to a point above a highest predicted height of the waves, in use; and at least one duct associated with the base structure for receiving an oscillating water column from the body of water, the oscillating water column oscillating in response to wave action of the incoming waves; wherein the duct forms part of an energy extraction system for capturing energy from the incoming waves, via the oscillating water column, and converting the captured energy into electrical energy.

Preferably, the duct has a first segment and a second segment arranged transversely to the first segment. In some embodiments, the duct is generally L-shaped wherein the first segment forms the lower substantially horizontal limb of the "L" and the second segment forms the upper substantially vertical limb of the "L". Preferably, the lower limb of the duct defines an inlet opening and the upper limb forms an outlet opening. In certain preferred embodiments, the L-shaped duct is oriented such that the substantially horizontal limb extends towards the direction of the prevailing ocean wave. Preferably, the longitudinal axis of the lower limb of the duct extends in a direction substantially parallel to the direction of the prevailing waves such that the inlet opening faces towards the oncoming waves.

It has been found that facing the inlet opening of an L-shaped duct towards the oncoming waves in particularly advantageous in enhancing the amplification of the rise and fall of the ocean waves produced in the oscillating water column within the duct, leading to corresponding increases in the amount of energy captured from the ocean waves, enhanced efficiency of the system and greater electrical output for a given wave action.

In preferred embodiments, the duct includes a flow control segment intermediate the first and second segments, the flow control segment being configured to inhibit turbulent flow of the oscillating water column flowing within the duct.

In certain embodiments, the duct is formed of a modular construction, wherein the first and second segments and flow control segment are constructed as separate elements and connected together. In other embodiments, the duct may be formed a one-piece unit.

In some embodiments, the first segment of the duct sits on the foundation of the base structure, and the second segment of the duct forms, at least partially, the wall of the base structure. In other embodiments, the duct itself may act as the base structure, or vice versa. In one preferred embodiment, the first segment of the duct sits directly on the floor of the body of water (e.g. seabed), and the second segment of the duct forms, at least partially, the wall of the base structure.

In some embodiments, the base structure is in the form of a breakwater. The breakwater base structure may be formed of large rocks or artificial blocks. Preferably, the base structure is seated on a substantially level base foundation such as, for example, a concrete slab or a leveled area of the seabed. The breakwater preferably has a core which is protected by a toe mound formed of smaller rocks, and may comprise a scourge protection layer installed to prevent any scourge. An under layer may be installed vertically above the toe mound, and positioned to rest on the core of the breakwater. The under layer is preferably made of finer rocks or sediment in order to enable a firm base for main armour. The main armour is preferably configured to dissipate the force of the waves rolling into the breakwater to enhance the durability of the breakwater and inhibit damage caused by the wave action. Rear armour may also be used in the breakwater. A concrete crest structure may be added onto the breakwater which can form an access way on the breakwater. For example, the concrete crest may be configured as a roadway for vehicular access along the breakwater (preferably along the entire length of the breakwater) and/or a pathway for light traffic access such as light vehicles and pedestrians.

The base structure may be positioned in relatively shallow water depths in the order of, for example, up to approximately 10 m to 15 m. In other applications, the base structure may be positioned in relatively deep water depths in the order of, for example, up to approximately 15 m to 30 m. It will be appreciated that the form and construction of the base structure will be designed to be suitable for a particular wave climate and water depth. Furthermore, the principles of the present invention may be used in depths greater than 30 m.

In various embodiments in which the duct itself acts as the base structure and sits directly on the seabed, the duct may be a gravity based structure which sits on the seabed under its own weight. It will be appreciated that such gravity based structures provide significant advantages in terms of eliminating or reducing the amount of preparation of the seabed that is required to be undertaken. For example, the use of gravity based structures may, in certain circumstances, avoid the requirement to install foundation piles for the foundation.

The gravity based oscillating water column duct structure may be formed of water resistant building materials such as, for example, steel and concrete. Concrete duct structures are particular advantageous as they provide little or no environmental hazards.

In some embodiments, the breakwater base structure is connected to the shore at one end. In one embodiment, the base structure may include a first portion connected to the shore at one point/location and a second portion connected to the shore at another point/location, wherein ends of the first and second portions of the base structure are spaced apart to create a passage for watercraft. In other embodiments, the base structure is not connected directly to the shore.

In certain embodiments, the base structure extends in a direction substantially parallel to the coastline and/or the direction of the prevailing ocean waves. In other embodiments, the base structure extends in a direction substantially perpendicular to the coastline and/or the direction of the prevailing ocean waves. In some embodiments, the base structure is arranged to extend at a predetermined angle between 0 and 90 degrees relative to the direction of the prevailing wave direction.

Preferably, the longitudinal axis of the lower limb of the duct is arranged to extend at a predetermined angle relative to the longitudinal axis of the base structure. In some embodiments, the longitudinal axis of the lower limb of the duct is arranged to be substantially perpendicular to the longitudinal axis of the base structure. In other embodiments, the longitudinal axis of the lower limb of the duct is arranged to be substantially parallel to the longitudinal axis of the base structure. In certain embodiments, the longitudinal axis of the lower limb of the duct is arranged to extend at a predetermined angle between directions perpendicular and parallel to the longitudinal axis of the base structure.

The energy extraction system preferably includes a turbine in fluid communication with the second segment of the duct such that the turbine is driven by a fluid flow from the second segment, the fluid flow being generated by oscillations of the oscillating water column within the duct. In some embodiments, an electric generator is configured for rotation by the turbine to generate the electrical energy. Preferably, the turbine has a plurality of rotor blades adapted for fluid communication with the second segment of the duct such that the turbine can be driven by a fluid flow from the second segment, the fluid flow being generated by oscillations of the oscillating water column within the duct, wherein an electric generator is configured for rotation by the turbine to generate the electrical energy.

In other preferred embodiments, the turbine and generator are configured as a combined single one-piece unit. Preferably, the combined turbine/generator unit includes a permanent magnet generator. The permanent magnet generator preferably makes use of permanent magnets arranged on or adjacent one or more of the tips of the turbine rotor blades. Preferably, permanent magnet generator includes multiple poles for varying the electricity produced. The combined turbine/generator unit preferably includes a housing which surrounds the turbine rotor blades. The combined turbine/generator unit provides advantages in terms of enabling ease of installation and reduced installation costs.

The duct is preferably located in a body of water such as an ocean, whereby the water column oscillates in response to the rise and fall of waves which reach the wall of the base structure and/or pass the duct. The fluid flow produced by the oscillating water column is preferably bi-directional. Preferably, the fluid associated with the fluid flow is one of a gas and a liquid. In certain embodiments, the fluid is air. In these embodiments, the turbine is preferably, but not necessarily, located above the mean surface level of the body of water in which the duct is located. In other embodiments, the fluid may be water. In these embodiments, the turbine may be, for example, a water turbine which is preferably, but not necessarily, submerged below the mean surface level of the body of water. Accordingly, it will be appreciated that the turbine may be driven directly or indirectly by the fluid flow associated with the oscillating water column.

In preferred embodiments, the flow control segment includes an angled or sloped portion (e.g. the sloped portion provides a fillet or chamfer-type profile when viewed in cross-section). The angled or sloped portion preferably extends at an angle so as to produce a relatively smooth and gradual change in direction of the oscillating water column (i.e. the change in direction from the first segment to the second segment), thereby inhibiting the extent of turbulent flow within the duct. In certain embodiments, the angled or sloped portion may comprise one or more segments arranged to provide the relatively gradual change in direction between the first segment and the second segment.

Preferably, the angled or sloped portion has a substantially flat inner and/or outer surface (as viewed in cross-section). The flat surface design provides significant advantages in terms of aiding a modular, robust and efficient construction of the duct whilst also providing surprising functional advantages in reducing turbulent flow and thereby improved energy conversion efficiency of the turbine, and the system as a whole. In some embodiments, the flow control segment includes a first curved or rounded joiner portion arranged between the first segment of the duct and the associated end of the planar surface of the flow control segment and a second curved or rounded joiner portion arranged between the second segment of the duct and the associated end of the planar surface of the flow control segment.

In other embodiments, the inner surface may be rounded or curved and the outer surface may be flat to provide the angled or sloped characteristic configuration to the flow control segment.

In some embodiments, the cross-sectional area of the flow control segment may vary along the length of the flow control segment. Advantageously, the variation in cross-section may, in certain embodiments, be configured to accelerate the water and/or air flow through the duct. The variation in cross-section may be configured to constrict the duct passage in manner which accelerates the flow during both intake and exhaust phases of the rising and falling wave cycle.

The first segment, the second segment and the flow control segment of the duct may be integrally formed as a one-piece unit. Preferably, the duct is an L-shaped pipe. The duct is preferably configured such that, in use, the first segment is arranged in a substantially horizontal orientation and the second segment is arranged in a substantially vertical orientation. In one particularly preferred embodiment, the flow control segment is a section of duct arranged to extend so as to provide an obtuse angle with the first segment of the duct. The flow control segment is also preferably arranged to extend so as to provide an obtuse angle with the second segment of the duct.

In certain embodiments, the flow control segment may be arranged to sit/extend across the mean sea level (MSL) of the ocean. In some embodiments, an inner surface/edge of the flow control segment extends across the mean sea level and an outer surface is submerged below the mean sea level such that the flow control segment joins the vertical duct segment about the mean sea level.

In some preferred embodiments, the angle between the first segment and the flow control segment is approximately 135°. In some preferred embodiments, the angle between the second segment and the flow control segment is approximately 135°. It will of course be appreciated that the respective angle between the first and second segments is not limited to these examples, but rather could be any suitable angle for producing a gradual change in direction for water flowing through the duct and thereby reduce turbulence within the duct. The angle between the respective segments of the duct is preferably determined in relation to the centre line of each segment (i.e. a line extending along the longitudinal axis of each segment).

Preferably, the length of each segment of duct is also taken as a measurement along the centre line of each segment such that the effective length of the duct is the combined lengths of each of the segments of the duct. For example, the total effective length of the duct is the sum of the length of the first segment, the flow control segment and the second segment.

In certain preferred embodiments, the length of the first segment of the duct is greater than the length of the second segment of the duct. In other preferred forms, the length of the second segment is greater than the length of the first segment. In yet further preferred embodiments, the first and second segments are substantially the same length. It will be appreciated that the length of the respective duct segment may be determined by the depth of the ocean at the location where the system is deployed/installed. For example, in relatively shallow depths of around 10 m, the length of the first (horizontal) segment can advantageously be made longer than the second (vertical) segment to provide a desired overall effective length of the duct. It will be appreciated that in shallow water applications the length of the vertical segment is necessarily restricted by the depth of the water. It has been found that a combination of segments of different lengths (e.g. long and short), together with an effective length related to the period of the prevailing ocean wave is particularly advantageous for use in breakwater applications of the ocean wave energy extraction system.

In preferred embodiments, the effective length of the duct is related or proportional to the period, T, of the prevailing ocean wave. Preferably, the effective length of the duct is related to the period of the waves by the formula, $L=T^2/4$; where L is the total effective length of the duct in meters (m), and T is the period of the waves in seconds (s). It has been observed that embodiments of the energy extraction system having an OWC duct with an effective length related to the period of the waves by this formula is particularly advantageous in terms of increased efficiency of operation.

In certain preferred forms, the length of the duct is in the range of about 25% to 45%, more preferably approximately 37%, of the wavelength of the prevailing waves.

It has been found that a combination of segments of different lengths (e.g. long and short), together with an effective length related to the period of the prevailing ocean wave is particularly advantageous for use in breakwater applications of the ocean wave energy extraction system to accommodate the depth of the ocean at a particular location.

Preferably, the effective length of the duct is fixed. In some particularly preferred form, the length of the duct may be one of approximately 10 m, 15 m, 20 m, 25 m, and 30 m. It will be appreciated that the duct is not limited to these specific examples, but may be any suitable length appropriate for the intended application (including the nature of the surrounding environmental conditions and wave climate) of the energy extraction system.

In certain preferred embodiments, the length of the duct may be variable for tuning the duct to suit the period of the waves of an ocean. In various embodiments, the first segment of the duct has a telescopic configuration for varying the length of the first segment and consequently the total effective length of the duct. The telescopic configuration of the first segment may include a plurality of portions, such as tubes, arranged to facilitate relative sliding movement of the tubes. Each pair of telescopic segments may have a locking means to lock the tubes relative to one another to set the desired length of the first segment of the duct. In other preferred forms, the length of the second segment may be adjustable in a similar manner (i.e. as well as or instead of an adjustable first segment). In other embodiments, one or more additional modules may be connected to the first segment to provide the desired increase in length. The or each additional module may be selected from a group of additional modules of various lengths which may, for example, be advantageous to readily accommodate changes to the wave period over time.

It will be appreciated that the inner cross-sectional area of the duct may be any suitable shape, including irregular shapes and may vary in size and shape along the length of the duct or along each respective segment. Preferably, the open area of the duct narrows, constricts or reduces towards the turbine so as to accelerate the fluid flow (e.g. airflow) to a more optimal velocity and pressure as it passes the turbine, enhancing the efficiency in turning the rotor of the turbine and thereby the overall efficiency of the energy conversion process. In some embodiments, the change in the open area of the flow passage may be provided by a secondary duct connect to, or otherwise in communication with, the second segment of the OWC duct. Preferably, the change in the open area of the flow passage of the duct facilitates acceleration of the fluid flow during both rising waves (i.e. the exhaust phase) and falling waves (i.e. the intake phase).

In certain embodiments, the duct has a dynamic resonance control mechanism for dynamically varying (i.e. lengthening or shortening) the effective length of the duct so as to match the resonant frequency of the duct with the period of the prevailing ocean wave. In certain embodiments, the dynamic resonance control mechanism includes a tuning aperture in a wall of the associated duct segment and a selectively moveable valve member, such as a shutter, flap, cover or gate for selectively adjusting the size of the tuning aperture between a fully opened position and a closed position. The shutter is preferably moveable to intermediate positions between the fully opened and closed positions in order to provide fine tuning of the variable length of the duct, to thereby substantially correspond with the frequency of the prevailing ocean wave.

In some embodiments, the shutter is hingedly mounted to the duct. In other embodiments, the shutter is slideably mounted over the tuning aperture.

In certain embodiments, a single dynamic resonance control mechanism is provided in the duct. In other embodiments, the two or more dynamic resonance control mechanisms may be arranged in the duct. Preferably, the two or more dynamic resonance control mechanisms are spaced apart along a segment of the duct. Each of the two or more dynamic resonance control mechanisms is independently operable so that a selected one or more of the two or more dynamic resonance control mechanisms can be opened or closed to provide a desired effective length of the duct.

In some embodiments, the dynamic resonance control mechanism includes sensing means for sensing the magnitude of the oscillations of the oscillating water column within the duct, which are indicative of the period of the prevailing ocean wave. The shutter is preferably in communication with the sensing means such that signals from the sensor are used to move the shutter to tune the resonant frequency of the duct to correspond with that of the current wave conditions. In other forms, the shutter is manually adjustable.

Preferably, the duct is configured such that the sensing means measures vertical oscillations of the OWC, and the tuning aperture and gate are arranged on an upper wall of the inlet section of the duct such that the gate moves substantially horizontally in response to the sensor signals to open or close the tuning aperture.

It will be appreciated that the dynamic resonance control mechanism advantageously facilitates substantially instantaneous in situ adjustment of the effective length of the duct for matching the resonant frequency of the duct with the current wave climate conditions.

The secondary duct preferably has an inlet opening which is smaller than the cross-sectional area of the vertical limb/segment of the OWC duct. The inlet opening of the secondary duct is preferably connected over the outlet opening of the OWC duct, wherein the difference in open area assists in accelerating the airflow during the exhaust phase under the action of a rising wave. In some embodiments, one or more baffle elements are arranged within the passageway at or adjacent the connection between the OWC duct and secondary duct. The or each baffle may have a symmetrical cross-sectional profile. For example, the or each baffle may be tapered from the centre towards its two edges. In one particularly preferred embodiment, two baffles are used.

Preferably, the secondary duct is shaped such that when it is connected to the OWC duct, the combined duct has a generally S-shaped construction. The secondary duct may have a substantially vertical segment, an intermediate curved or angled section, and a substantially horizontal segment. Preferably, the substantially vertical segment defines the inlet opening and the substantially horizontal segment defines an outlet to the atmosphere. The turbine/generator unit is preferably located within or adjacent to the outlet of the secondary duct. Preferably, the open area of the vertical segment of the secondary duct is smaller than the open area of the horizontal segment of the secondary duct to thereby effect acceleration of the air flowing in from the atmosphere during the intake phase under the ation of a falling wave.

In certain embodiments, the inlet, submerged or seaside end of the OWC duct may have a larger opening than the outlet or exposed end of the duct to provide the desired acceleration of the flow. In one preferred embodiment, the opening of the submerged end is a rectangular opening which is wider than it is high. The width of the rectangular opening may be such that vertical support bracing element are required to extend from the roof to the floor of the first segment of the duct to accommodate the span. In some embodiments, there may be two vertical bracing elements, preferably spaced evenly across the width of the duct, to thereby effectively provide three passage ways in or along the first horizontal duct segment. The bracing preferably stops before the flow control segment so that the water in each passage converges into a single flow passage defined by the flow control passage and the vertical duct segment. In some embodiments, the flow control passage and/or the vertical duct segment may taper along its length (e.g. a sideways taper) to assist the flow to converge and/or to assist in accelerating the flow.

In certain embodiments, the source of the acceleration (i.e. the change in open area of the duct) is arranged on the OWC side or waterside (as opposed to the airside) of the turbine and acts to accelerate the airflow through the turbine during both the exhaust and intake phases. In other embodiments, there may be a first source of acceleration arranged on the waterside for accelerating the airflow through the turbine during the exhaust phase and a second source of acceleration arranged on the airside for accelerating the airflow through the turbine during the intake phase.

In other forms, the duct may have a constant inner cross-sectional area. The inner cross-sectional area of the duct may be square or rectangular. In other forms, the inner cross-sectional area is preferably circular. It will be appreciated that the cross-sectional area of the duct is not limited to the above listed shapes, but may take any suitable shape including polygonal and irregular shapes.

Preferably, the turbine operates uni-directionally in response to the bi-directional fluid flow. The turbine is preferably an air-driven turbine, but in certain embodiments it may be a water-driven turbine. In preferred embodiments, the turbine is a reaction turbine.

In certain preferred forms, the OWC duct and secondary duct is arranged to allow the airflow generated by the OWC to pass directly through the turbine. It will be appreciated that the direct passage for the airflow to the duct, in combination with the ability of the turbine to rotate uni-directionally in response to the bi-directional airflow, advantageously results in a simple and efficient construction and avoids the need for additional complex arrangements and/or mechanisms such as one-way valves or gates to direct the airflow in a particular manner appropriate for the turbine.

Preferably, the turbine includes a turbine rotor assembly for extracting energy from the oscillating working fluid, the turbine rotor assembly including: a hub rotatable about a central axis; a plurality of blades mountable to the hub about the central axis, each blade having a leading edge and a trailing edge, wherein the leading edge and trailing edge are configured to be complementary in profile to each other such that the blades can be mounted in close fitting edge-to-edge proximity to each other.

Preferably, the plurality of blades are arranged sequentially to form a circular array about the central axis. The blades are preferably arranged in a non-overlapping sequential formation.

Preferably, each blade has a generally symmetrical cross-sectional profile. However, in certain preferred forms, asymmetric profiles can be employed. The cross-sectional profile is preferably in the form of an aerofoil. Preferably, the aerofoil has a biconvex (or convex-convexo) profile. In other embodiments, one surface of the aerofoil has a concave profile and the opposing surface is convex. The aerofoil profile preferably has an enlarged rounded leading edge and tapers inwardly towards a narrower trailing edge. In other preferred forms, each blade has a generally planar profile (e.g. a flat plate) with substantially parallel side faces.

In certain embodiments, the blades can be interchangeable with blades of a different profile so as to achieve a different operating characteristic of the turbine.

The ocean wave energy extraction system may include a plurality of ducts, each duct being configured to receive an associated oscillating water column. Each of the plurality of ducts is preferably arranged to face in the same direction relative to the prevailing ocean wave. The plurality of ducts may be arranged along a common axis. Preferably, the plurality of ducts are arranged to form a linear array. In some preferred embodiments, the plurality of ducts includes groups or clusters of ducts, whereby two or more groups are arranged to form the array of ducts and each group or cluster may have one or more OWC ducts. In certain embodiments, each group of ducts has the same formation. In other preferred forms, at least one group of ducts has a different formation to one or more of the other groups. Preferably, the ducts of each group are arranged along a common axis.

In certain preferred embodiments, the length of each duct in a linear array of ducts may be different along the length of the array. For example, the length of the ducts may increase along the array with the duct closest to shore being the shortest and the duct further from shore being the longest, or vice versa. The intermediate ducts preferably increase in length in a stepwise manner from duct-to-duct along the array. An array of ducts which vary in length is particularly advantageous for accommodating changes in characteristics in the waves due to bathymetry of the seabed and wave climate of the particular location at which the system is located.

The ocean wave energy extraction system is preferably configured such that an open end (or inlet) of each duct is substantially at the same depth below the mean surface level of the body of water in which the system is located, in use. In other embodiments, the open end of one or more of the ducts is at different depth relative to the other open end of other ducts.

Preferably, a separate turbine is mounted to each duct of the plurality of ducts such that each turbine is independently driven by the oscillating water column of the associated duct. Alternatively, the bi-directional fluid flow from two or more ducts is may be used to drive the same turbine.

In certain embodiments, the turbine is arranged such that its axis of rotation is transverse to a longitudinal axis of the duct. In other embodiments, the turbine is arranged such that its axis of rotation is substantially parallel to the longitudinal axis of the duct. In some embodiments, the axis of rotation of the turbine is coaxial with the duct.

In some embodiments, the duct rests on the floor of the body of water. In other embodiments, the duct is preferably held in a desired position and orientation in the body of water by a mooring system. The mooring system may hold the duct at a predetermined height above the floor of the body of water. To maintain the duct substantially at the predetermined height, the mooring system may include a buoyancy element for facilitating floatation of the duct.

In various preferred embodiments, the ocean wave energy extraction system includes two or more ducts arranged to form an array of ducts, each duct in the array being arranged to receive an associated oscillating water column. The two or more ducts are preferably arranged to face in the same direction relative to the prevailing ocean wave. In some preferred embodiments, the two or more ducts are arranged in side-by-side relation. However, in certain embodiments it is advantageous to have an array of ducts in which the two or more ducts are oriented in different directions relative to each other and thus relative to the prevailing ocean wave.

In certain embodiments, each duct in the array of ducts has substantially the same length as the other ducts. In other preferred forms, the array of ducts can include ducts of different lengths to account for waves of different wavelengths.

In some embodiments, the array of ducts is configured such that each of the associated oscillating water columns drives a single turbine. In other embodiments, each oscillating water column, or a group of oscillating water columns, from the respective duct, or group of ducts, drives an associated turbine. In other embodiments, the array of ducts can be formed of discrete groups of ducts, whereby each group has an associated turbine which the group is configured to drive. In some embodiments, the system includes a support frame for holding the ducts in relative spaced relation to each other.

In certain embodiments, the base structure or the OWC ducts (if forming the base structure) accommodate a service driveway for easy access to equipment from shore to locations along the base structure. The provision of a service driveway incorporated within the system itself provides advantages by enabling easier and direct access to the system components located on the breakwater.

In some embodiments, the base structure is used a base for a secondary offshore energy extraction system, such as wind turbines to increase energy production. The base structure may incorporate an offshore communication and/or offshore control tower, including, for example, HF radar installations for monitoring wind and wave conditions. In some embodiments, the base structure facilitates a shared working interrelationship of electrical equipment between components of the systems.

According to a second aspect of the invention, there is provided an ocean wave energy extraction system including:

at least one duct for receiving an oscillating water column, the oscillating water column oscillating in response to the rise and fall of ocean waves; and a turbine in fluid communication with the duct such that the turbine is driven by a fluid flow generated by the oscillations of the oscillating water column within the duct to thereby extract energy from the ocean waves;

wherein the duct is adapted to extend, in use, to a point above a highest predicted height of the ocean waves to intercept the waves before the waves reach a coastline to reduce the impact of wave action on the coastline. In one embodiment, at least a portion of the duct rests on the floor of the ocean or seabed.

It will be appreciated that the energy extraction system (or energy recovery mechanism) may be used in various applications to provide a source of primary standalone source of power. In other applications, the energy extraction system may be adapted to provide a source of intermittent, supplementary or regenerative power. The power may be fed directly into a supply system for immediate use or stored until needed (e.g. in a battery).

According to a third aspect of the invention, there is provided an ocean wave energy extraction system, including:

a base structure arranged in a body of water, the base structure extending from a floor of the body of water and extending to a point above a highest predicted height of the waves; and at least one duct mounted on the base structure for receiving an oscillating water column from the body of water, the oscillating water column oscillating in response to wave action of the incoming waves;

wherein the duct is in fluid communication with an energy conversion unit for converting energy associated with the oscillating water column into electrical energy.

In some preferred embodiments of this aspect of the invention, the base structure is in the form of a jetty, wharf, marina or the like. Again, in some embodiments, one or more ducts may be mounted to the base structure. There may be a one-to-one relationship between the number of ducts mounted to the base structure and the number of energy extraction/conversion systems. That is, in some embodiments each duct may be associated with its own dedicated energy conversion system. In other embodiments, a group of two or more ducts may be in communication with a single energy conversion system. Similarly, the plurality of ducts may be mounted to the base structure so as to be evenly and periodically spaced along the structure. In other forms, the ducts may be mounted in an irregular spacing pattern. In yet other forms, groups of ducts may be spaced along the base structure in regular or irregular spacing patterns or intervals. Each or some of the groups of ducts may have the same number of ducts or there may be variation in the number of ducts in each group. The number of ducts in a particular group and/or the spacing between ducts may be determined with reference to the distance at which the respective duct/group is located from shore.

In some embodiments, the base structure may form at least part of a housing for a desalination plant which is coupled to the wave energy converter to produce fresh water. In such embodiments, the turbine may be configured to operate as a pump. In certain forms, the energy produced by the wave energy converter may be used to power at least some components of the desalination unit.

In other embodiments, the base structure may be in the form of a floating structure such as, for example, a large vessel, ship or oil/gas platform, wherein the wave energy convertor is attached to the structure and adapted to provide power to at least some components of the structure. In such embodiments, it will be appreciated that the base structure may not extend as low down as the seabed.

In a further aspect, the invention provides a turbine assembly for extracting electrical energy from an oscillating working fluid, the assembly including:

a housing;

a hub arranged within the housing, the hub being rotatable about a central axis; and a plurality of blades mountable to the hub about the central axis;

wherein, the rotatable hub is in communication with and operatively associated with a permanent magnet generator.

In some embodiments, the permanent magnet generator is a multiple pole generator. Preferably, the permanent magnet generator includes one or more permanent magnets arranged on one or more of the turbine rotor blades. The permanent magnet generator preferably includes one or more permanent magnets arranged on, or adjacent to, one or more tips of the turbine rotor blades.

In certain embodiments, the housing is mounted to an oscillating water column duct adapted for location in a body of water, the duct being adapted to generate the oscillating working fluid in response to rising and falling waves, and the housing being mounted such that the rotor is in fluid communication with the oscillating fluid and rotatable in response to fluid flow over the blades. Preferably, the fluid flow a bi-directional airflow, and the rotor rotates unidirectional in response to the bi-directional airflow.

BRIEF DESCRIPTION OF THE DRAWINGS

Preferred embodiments of the invention will now be described, by way of example only, with reference to the accompanying drawings in which.

DETAILED DESCRIPTION OF THE DRAWINGS

Figure 1:
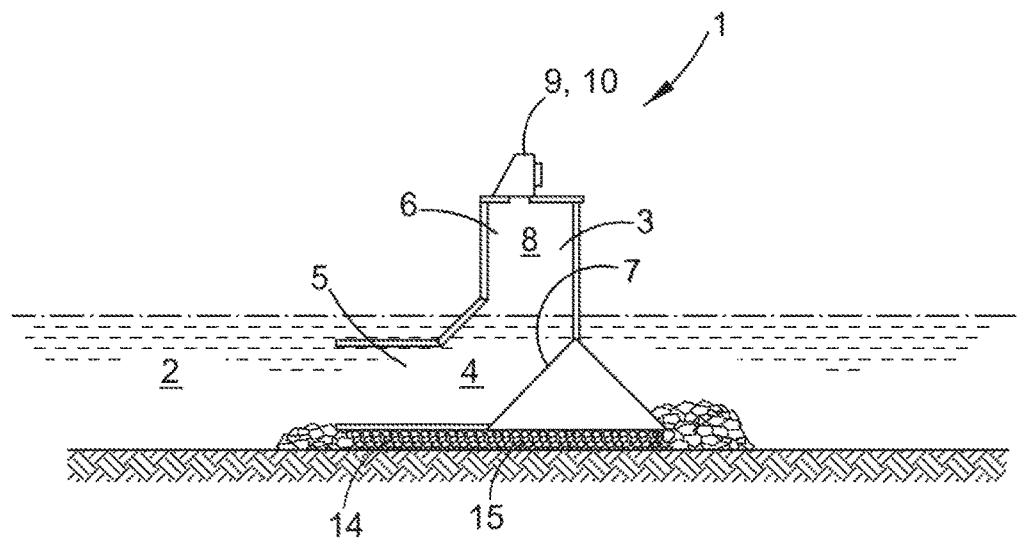
FIG. 1 is a cross-sectional view of an embodiment of a coastal protection system incorporating an ocean wave energy extraction system according to the invention.

Referring to the drawings, a coastal protection and ocean wave energy extraction system 1 is located in a body of water such as an ocean 2. The ocean wave energy extraction system 1 includes a duct 3 for receiving ocean water to form a water column 4. As will be described in greater detail below, the water column oscillates within the duct 3 in response to the rise and fall of ocean waves moving past the ocean wave energy extraction system 1.

The duct 3 has a first substantially horizontal segment 5, a second substantially vertical segment 6 arranged transversely to the first segment and a flow control segment 7 intermediate the first and second segments. As shown in FIG. 1, the duct 3 is substantially L-shaped and constructed such that the first segment 5, the second segment 6 and the flow control segment 7 form a one-piece unit. Each segment of the duct 3 is open at its ends to form a continuous through-bore along the duct. In the embodiment illustrated in the drawings, the bore of the duct has a rectangular cross-sectional area. However, it will of course be appreciated that in other embodiments the cross-section may be any suitable shape, and may be a constant or varying open area.

The duct 3 amplifies the amplitude of each ocean wave passing the ocean wave energy extraction system 1 such that the amplitude of the oscillations of the oscillating water column 4 within the duct is greater than the amplitude of the passing ocean waves.

The flow control segment 7 is configured to reduce turbulent flow of the oscillating water column 4 flowing within the duct 3 to provide a more controlled, steady and consistent airflow generated by the movement of the water column. In particular, the flow control segment 7 is configured to provide a smooth and gradual change in direction as the water flows from the first segment 5 to the second segment 6. This gradual change in direction reduces the amount of turbulent flow in the oscillating water column 4 as the column flows through the duct. The flow control segment 7 reduces the level of turbulent flow through the duct 3 to such an extent that there is a positive impact on the amplification of the amplitude of the ocean waves, as demonstrated by the increase in the oscillations of the water column within the duct. It will be appreciated that this reduction in turbulent flow leads to a corresponding increase in the overall efficiency of energy conversion by the system 1.

In the illustrated embodiments, the oscillating water column 4 does not fill the entire duct 3 and therefore does not extend to the end of the second segment 6 of the duct. The second segment 6 defines an air chamber 8 located above the oscillating water column 4. As an ocean wave rises, there is a corresponding upward oscillation of the oscillating water column 4 within the duct 3. This upward oscillation forces the volume of air from the air chamber 8 of the second segment 6 of the duct 3 to create an upward airflow (i.e. the exhaust phase). Similarly, a downward airflow is generated in response to a downward oscillation of the water column 4 as an ocean wave falls (i.e. the intake phase).

A unidirectional turbine 9 is arranged above the second segment 6 of the duct 3 to be in fluid communication with the second segment 6. The turbine 9 is driven or rotated by the upward and downward airflows. Although the airflow is bi-directional due to the rise and fall of the ocean waves, the turbine 9 is advantageously configured to rotate unidirectionally in response to the bi-directional airflow.

Figure 8:
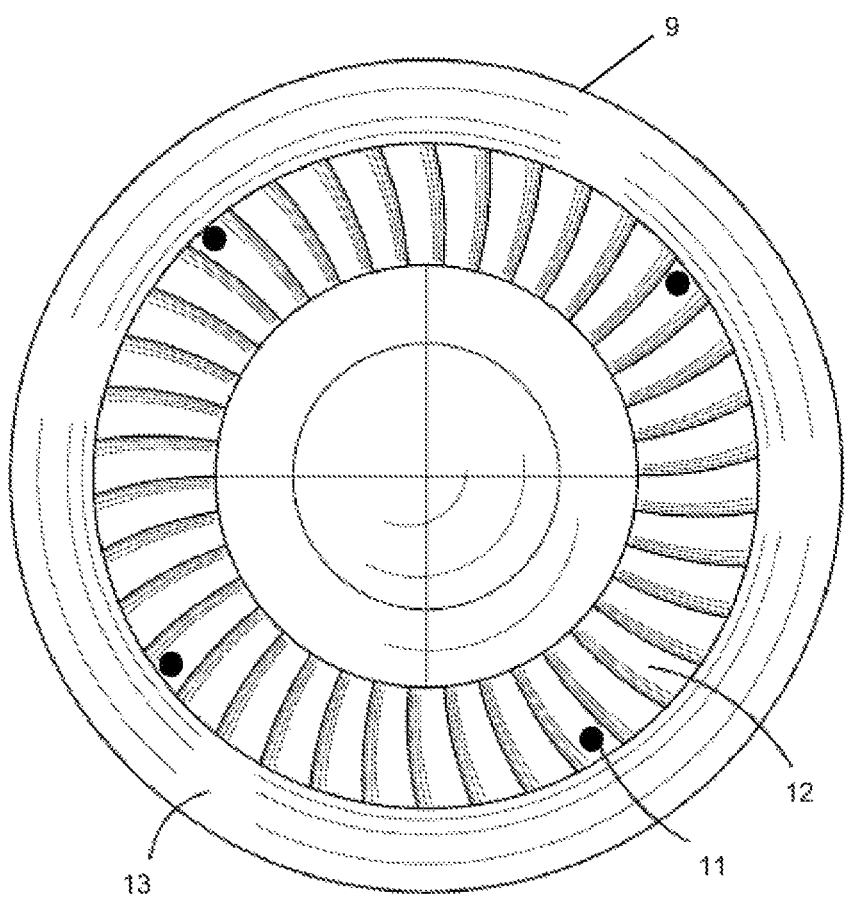
FIG. 8 shows an end view of an embodiment of a combined turbine/generator unit for use in the ocean wave energy extraction system.

The illustrated embodiment of the system 1 the turbine 9 forms part of a combined turbine and generator unit 10 which operates with a permanent magnet generator. As most clearly shown in FIG. 8, the combined turbine/generator unit 10 includes permanent magnets arranged adjacent to the tip 11 of one or more of the turbine rotor blades 12. The permanent magnet generator preferably includes multiple poles for varying the electricity produced. The combined turbine/generator unit 10 includes a housing 13 which surrounds the turbine rotor blades 12. The housing 13 is preferably shaped to assist in directing airflow towards the rotor blades 12. The combined turbine/generator unit is advantageous due to its ease of installation it water based environments and the associated reduction in installation costs.

As shown in FIGS. 1-3, 7A-7B, the passageway from the OWC duct 3 to the turbine/generator unit is significantly smaller than the cross-sectional area of the vertical limb of the OWC duct. This change in the passageway opening greatly assists in accelerating the airflow generated during the exhaust phase, under the action of a rising wave, as it travels towards the blades of the turbine. In addition, in these figures it can be seen that the passageway is located towards the ocean side of the seawall (or duct). This placement advantageously reduces the chance of wave splash arising from larger than normal wave conditions (e.g. during storms) from passing up into the turbine/generator unit. Due the seaside or rearward placement of the passageway, any splash which would otherwise reach the height of the turbine unit hits the roof of the OWC chamber falls back into the oscillating water column.

A number of alternative base structure configurations 14 will now be described with reference to the embodiments illustrated in FIGS. 1 to 3.

Referring to FIG. 1, the duct 3 sits a base structure 14 in the form of a rock based foundation 15. An ocean side toe mound 16 is arranged at the ocean side edge of the rock foundation 15 and a harbor side toe mound 17 is arranged at the harbor or bay side edge of the rock foundation 15. The toe mounds (16, 17) act to retain the rock elements of the foundation 15 in place. In this embodiment, the lower horizontal limb of the duct 3 sits on the leveled foundation 15 with the inlet opening facing the ocean side and thus towards the direction from which ocean waves will travel.

Here, the foundation 15 of the base structure 14 is fully submerged below the mean sea level (MSL), sitting on the seabed. The duct 3 extends from the foundation 15 to a point above the surface of the water and above the highest predicted wave height for the wave climate of the particular region. The duct 3 therefore is configured to act as a seawall for protecting the coastline against incoming waves.

Figure 2:
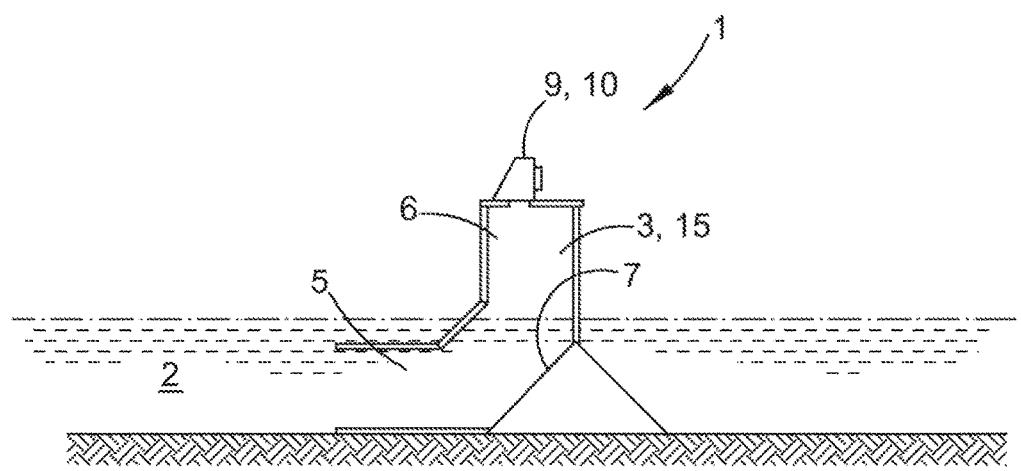
FIG. 2 is a cross-sectional view of another embodiment of a coastal protection system incorporating an ocean wave energy extraction system according to the invention.

In the embodiment of FIG. 2, the horizontal limb of the duct 3 sits directly on the seabed. The vertical limb of the duct 3 extends from the seabed to a point above the surface of the water and above the highest predicted wave height for the wave climate of the particular region. The duct 3 therefore again configured to act as a seawall for protecting the coastline against incoming waves.

The duct in this embodiment is a gravity based structure which sits on the seabed under its own weight. Gravity based structures provide significant advantages in terms of eliminating or reducing the amount of preparation of the seabed that is required to be undertaken. For example, the use of gravity based structures may, in certain circumstances, avoid the requirement to install foundation piles for the foundation, as illustrated in FIG. 2. The gravity based oscillating water column duct structure may be formed of water resistant building materials such as, for example, steel and concrete. Concrete duct structures are particular advantageous as they provide little or no environmental hazards.

Figure 3:
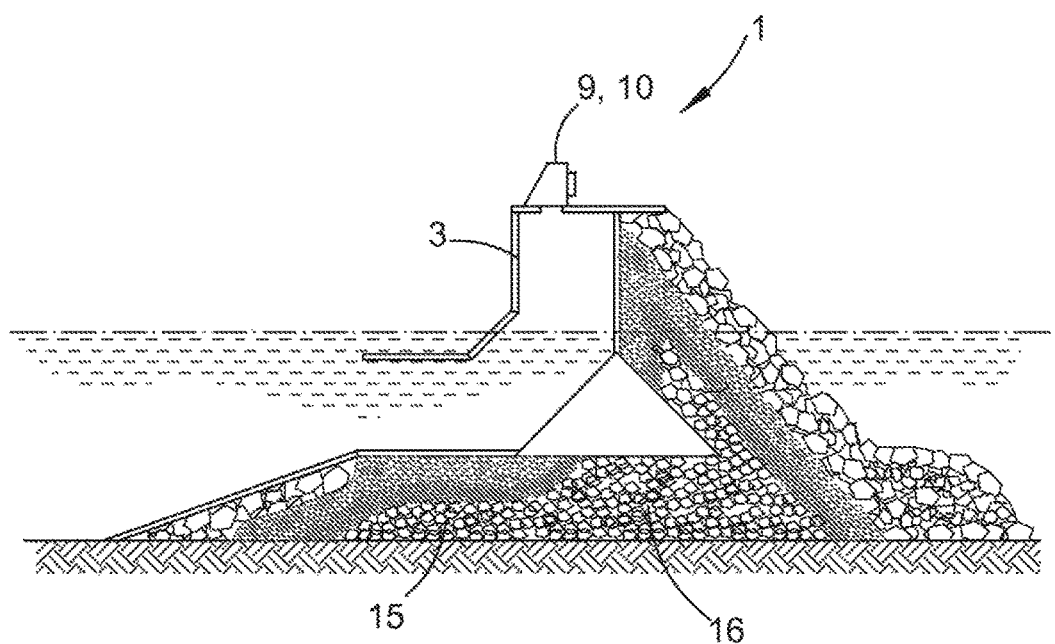
FIG. 3 is a cross-sectional view of another embodiment of a coastal protection system incorporating an ocean wave energy extraction system according to the invention.

Referring to FIG. 3, another embodiment of the base structure 14 is illustrated. In this embodiment, the base structure 14 has a rock based foundation 15. The foundation 15 has a core 16 formed of large rocks or artificial blocks. A number of protective and armour layers formed of smaller rocks are installed around the core 16 of the foundation 15 to maintain the position of the rocks forming the core of the foundation. An under layer may be installed vertically above the toe mound, and positioned to rest on the core of the breakwater. The under layer is preferably made of finer rocks or sediment in order to enable a firm base for main armour. The main armour is preferably configured to dissipate the force of the waves rolling into the breakwater to enhance the durability of the breakwater and inhibit damage caused by the wave action. Rear armour may also be used in the breakwater. A concrete crest structure may be added onto the breakwater which can form an access way on the breakwater. For example, the concrete crest may be configured as a driveway (see FIGS. 4 and 5) for vehicular access along the breakwater (preferably along the entire length of the breakwater) and/or a pathway for light traffic access such as light vehicles and pedestrians.

Figure 4:
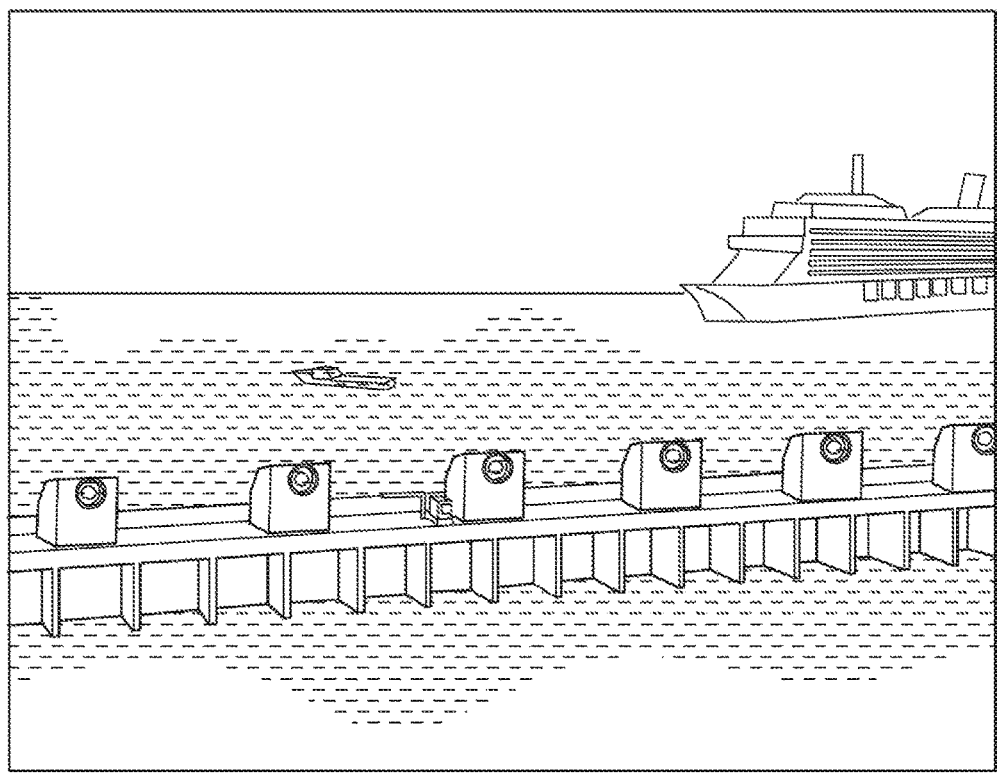
FIG. 4 is a schematic perspective view of an embodiment of a coastal protection system incorporating a plurality of ocean wave energy extraction systems according to the invention.

FIG. 4 shows an embodiment of the coastal protection and ocean wave energy extraction system 1 located in an ocean 2. In this embodiment, the breakwater base structure is formed as a linear array of OWC ducts 3 placed in abutting side-by-side relationship. A separate turbine/generator unit is mounted over each duct at regular spaced apart intervals. The top of the duct is configured to include a driveway for vehicular access during maintenance, servicing and other requirements.

Figure 5:
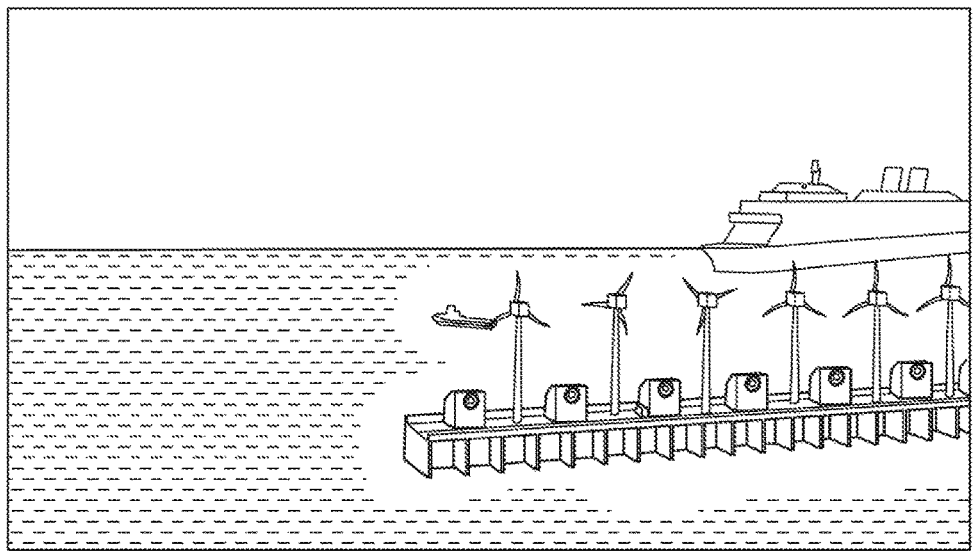
FIG. 5 is a schematic perspective view of another embodiment of a coastal protection system incorporating a dual source energy extraction system comprising an ocean wave energy extraction system and a wind turbine energy extraction system.

In the embodiment of FIG. 5, a coastal protection system incorporating a dual source energy extraction system. The dual system incorporates the ocean wave energy extraction system described above and a wind turbine energy extraction system. The base structure provides a convenient offshore structure on which to mount the wind turbines. The number of wind turbines may correspondence to the number of OWC ducts as in the illustrated embodiment, by this need not be the case. Those skilled in the art will appreciate that wind turbines are typically located onshore. Accordingly, the provision of a stable and robust offshore base structure, in combination with the ability to draw on two sources of energy, namely wave and wind energy, provides significant commercial and operational advantages due to an increased production of usable power.

Although not illustrated in FIG. 4-5, the breakwater base structure is connected to the shore at one end. As shown in FIG. 5, the other end is surrounded by water such that marine craft can pass from the exposed ocean side to the protected bay side. In addition, the structure can be used as a shelter for marine vessels in high seas.

Figure 6:
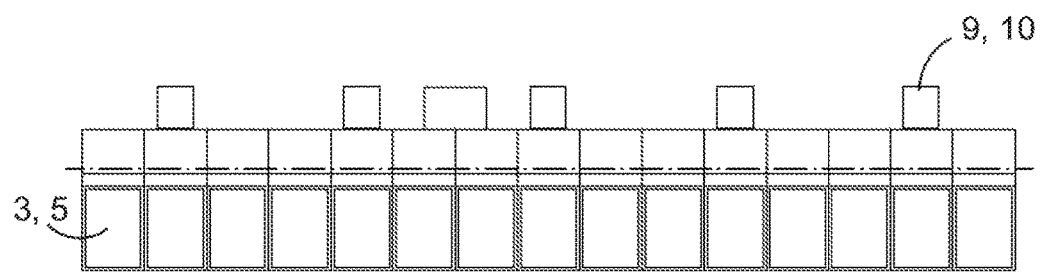
FIG. 6 is a schematic inlet end view of an array of oscillating water column ducts of the energy extraction system arranged side-by-side to form a breakwater base structure.
Figure 7A:
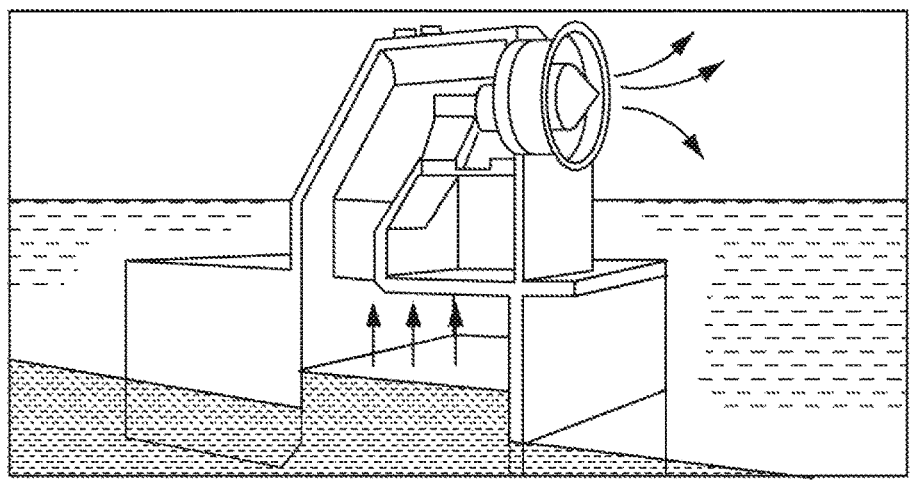
FIGS. 7A and 7B show a partial cross-sectional perspective view of an oscillating water column duct the ocean wave energy extraction system during a rising wave and falling wave, respectively.
Figure 7B:
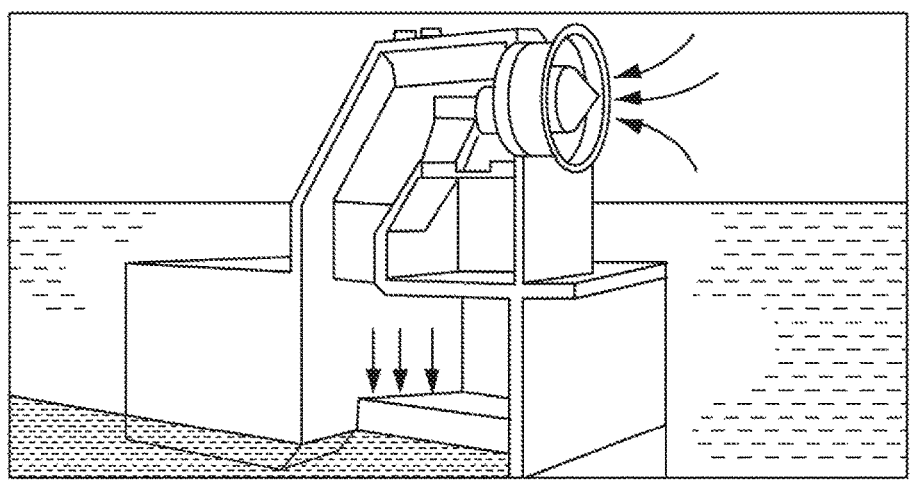

FIG. 6 is a schematic inlet end view of an array of oscillating water column ducts of the energy extraction system arranged side-by-side to form the breakwater base structure of either FIG. 4 or 5. In each OWC unit, each inlet opening of the OWC duct has two vertical structural bracing members to support the width/span of the lower horizontal limb of the duct.

The base structure may be positioned in relatively shallow water depths in the order of, for example, up to approximately 10 m to 15 m. In other applications, the base structure may be positioned in relatively deep water depths in the order of, for example, up to approximately 15 m to 30 m. It will be appreciated that the form and construction of the base structure will be designed to be suitable for a particular wave climate and water depth. Furthermore, the principles of the present invention may be used in depths greater than 30 m.

The base structure preferably extends in a direction substantially parallel to the coastline and/or the direction of the prevailing ocean waves.

Figure 9A:
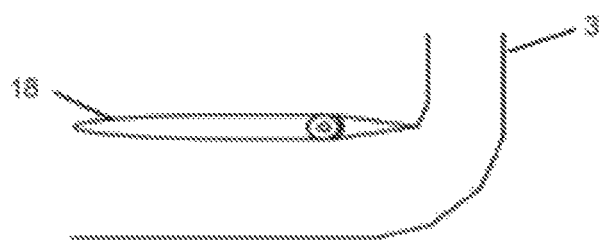
FIG. 9A to 9C show a schematic side view of a duct incorporating a dynamic resonance control mechanism with the shutter in a closed position, first open position and second open position, respectively.
Figure 9B:
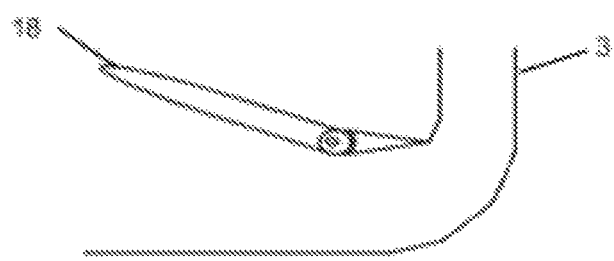
Figure 9C:
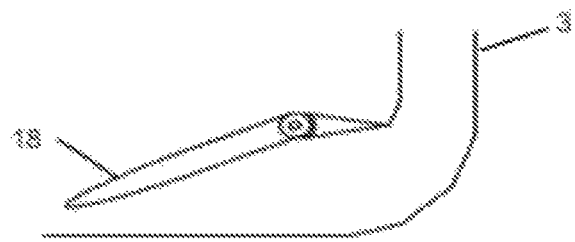
Figure 10:
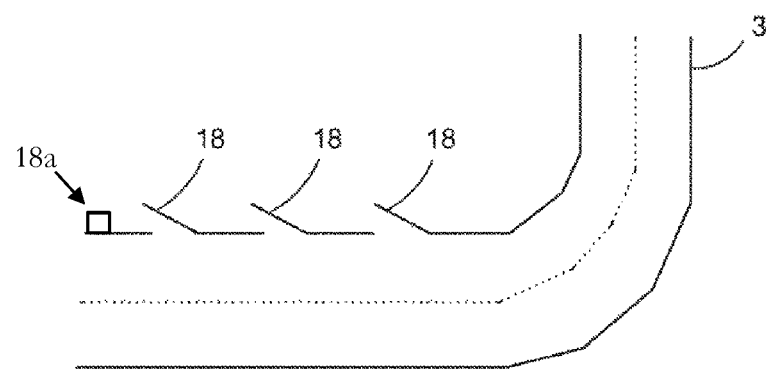
FIG. 10 is a side view of a duct incorporating a dynamic resonance control mechanism with three independent shutter valves.
Figure 11:
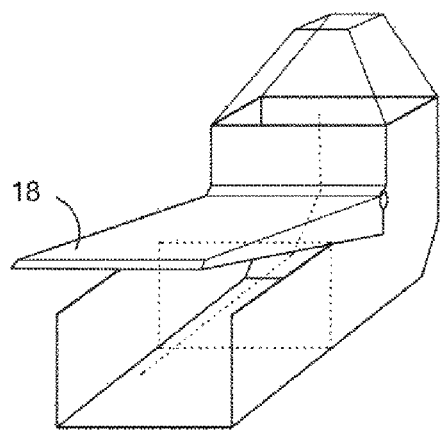
FIG. 11 shows a perspective view of an embodiment of a dynamic resonance control mechanism in which the lid of the duct is hinged to act as a shutter.

Referring now to FIGS. 9 to 11, a number of embodiments of the duct incorporate a dynamic resonance control mechanism for dynamically varying (i.e. lengthening or shortening) the effective length of the duct so as to match the resonant frequency of the duct with the period of the prevailing ocean wave.

FIG. 9A to 9C show a schematic side view of a duct incorporating a dynamic resonance control mechanism in the form of a hingedly movable shutter 18. In FIG. 9A, the shutter 18 is in a closed position such that the effective length is determined by the dimensions of the duct itself. In FIGS. 9B and 9C, the shutter 18 is shown in two alternative positions which provide different effective lengths to the duct, thus advantageously allowing tuning of the resonance of the duct to correspond with the period of the prevailing ocean wave to enhance the amplification provided by the OWC duct.

FIG. 10 shows an embodiment in which three hinged shutters 18 are provided in the top or lid section of the first segment of the duct. Each of the three hinged shutters 18 can be opened and closed independently of the others for tuning the resonant frequency of the duct. It will be appreciated that a configuration of two or more shutters 18 advantageously provides advantages in terms of enabling a range of opened and closed patterns, thereby providing greater flexibility in tuning the effective length of the duct. Each shutter is preferably in communication with a sensing means 18a such that signals from the sensor are used to move each shutter to tune the resonant frequency of the duct to correspond with that of the current wave conditions.

FIG. 11 shows a perspective view of an embodiment of a dynamic resonance control mechanism in which the lid of the duct is hinged to act as a shutter. The embodiment provides advantages in terms of simplicity of construction and ease of use.

Figure 12:
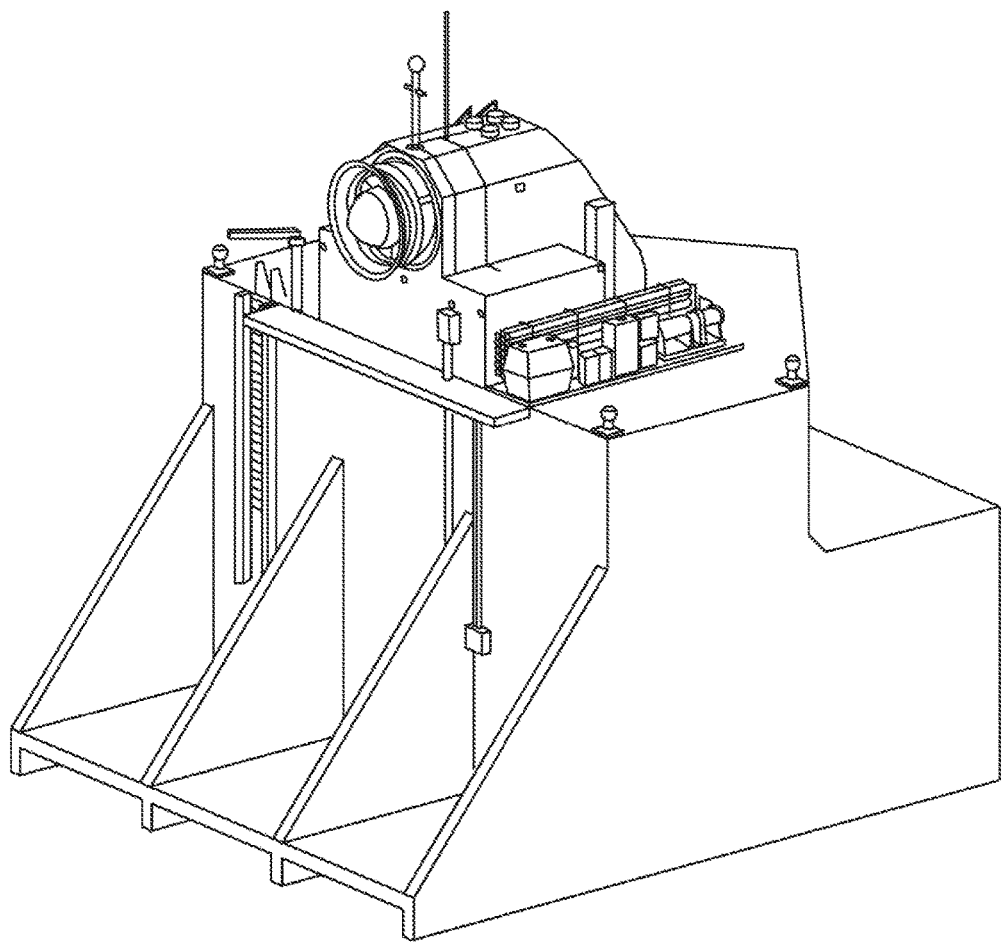
FIG. 12 shows a schematic view of an embodiment of the ocean wave energy extraction system incorporated into a desalination plant.

FIG. 12 shows a schematic view of an embodiment of the ocean wave energy extraction system incorporated into a desalination plant. In this embodiment, the energy produced by the wave energy converter may be used to power at least some components of the desalination unit.

Accordingly, it is an advantage of at least a preferred embodiment of the invention to provide a combined costal protection system with an integrated ocean wave energy extraction system. The ocean wave energy extraction system can be advantageously incorporated into a rock formed breakwater base structure or seawall. In alternative embodiments, an OWC duct of the system may sit directly on the seabed under its own weight and extend above the surface of the ocean to thereby form the base structure and seawall itself.

Advantageously, various embodiments of the breakwater base structure may be positioned or installed either in deep or shallow water and be formed of materials which cause little or no environmental hazards. In shallow water applications, the breakwater base structure may advantageously be a gravity based structure which sits on the seabed under its own weight, avoiding the need for foundation piles which require costly labour intensive and time consuming processes to install.

In addition, certain embodiments advantageously a reduction in the amount of electrical equipment required for a complete system comprising an array with multiple ducts and turbines. For example, it may be possible reduce capital equipment costs by sharing common equipment, such as transformers, electrical drives and electric cables (e.g. groups of five turbines may share this equipment).

The system can also be manufactures in a modular manner which advantageously allows its construction to be done offshore and float the individual units out to the deployment location. It will be appreciated that such onshore construction enables significant reduce in manufacturing costs compared to offshore manufacturing. For example, construction of OWC ducts can be carried out using pre-cast steel/concrete panels and assembled together before towing to site. The use of durable concrete for construction of OWC ducts is also advantageous as it significantly reduces any ongoing maintenance costs.

It will also be appreciated that embodiments of the present invention may be used in newly constructed costal management structures, or retrofitted to existing breakwater structures, jetties, marinas, docks and the like which can serve as a base structure. It is yet still a further advantage of at least a preferred embodiment of the present invention to provide an ocean wave energy extraction system which reduces the visual impact on the surrounding environment. Furthermore, the base structure can provide environmental benefits by encouraging the growth of marine life on the structure. In these and other respects, the invention represents both a practical and commercially significant improvement over the prior art.

Although the invention has been described with reference to specific examples it will be appreciated by those skilled in the art that the invention may be embodied in many other forms.

The invention claimed is:

1. A wave energy generator for a coastal protection system, including:
   a base structure adapted to be arranged in a body of water so as to protect a coastline against incoming waves, the base structure having a foundation locatable on a floor of the body of water and a wall extending from the foundation to a point above a highest predicted height of the waves, in use; and
   at least one duct associated with the base structure for receiving an oscillating water column from the body of water, the oscillating water column oscillating in response to wave action from the incoming waves; wherein the duct forms part of an energy extraction system for capturing energy from the incoming waves, via the oscillating water column, and converting the captured energy into electrical energy; wherein the duct comprises two or more dynamic resonance control mechanisms for dynamically varying the effective length of the duct so as to match the resonant frequency of the duct with the period of the prevailing ocean wave.

2. A wave energy generator according to claim 1, wherein the dynamic resonance control mechanisms comprise a tuning aperture in a wall of the duct and a selectively moveable valve member for selectively adjusting the size of the tuning aperture to intermediate positions between a fully opened position and a fully closed position.

3. A wave energy generator according to claim 1, wherein each of the two or more dynamic resonance control mechanisms is independently operable so that a selected one or more of the two or more dynamic resonance control mechanisms can be opened or closed to provide a desired effective length of the duct.

4. A wave energy generator according to claim 2, wherein the valve member is hingedly mounted to the duct.

5. A wave energy generator according to claim 1, wherein the dynamic resonance control mechanisms comprise a sensor for sensing the magnitude of the oscillations of the oscillating water column within the duct.

6. A wave energy generator according to claim 5, wherein the sensor is in communication with the moveable valve member such that signals from the sensor are used to move the moveable valve member to tune the resonant frequency of the duct to correspond with that of the current wave conditions.

7. A wave energy generator according to claim 1, further comprising a turbine/generator unit in fluid communication with the duct, and the oscillating water column produces a bi-directional airflow, the turbine being driven by the airflow in a unidirectional direction.

8. A wave energy generator according to claim 7, wherein a cross-sectional area of the duct varies in at least one region such that this region accelerates water flowing through that region of the duct, whereby a corresponding airflow reaches a desired velocity for passing through the turbine.

9. A wave energy generator according to claim 1, wherein the duct is generally L-shaped having a first segment which forms a lower substantially horizontal limb of the duct and a second segment which forms an upper substantially vertical limb of the duct, the lower limb defining an inlet opening and the upper limb forming an outlet opening, the L-shaped duct being oriented such that the substantially horizontal limb extends towards the direction of the prevailing ocean wave, whereby the inlet opening faces towards the oncoming waves.

10. A wave energy generator according to claim 1, wherein the duct itself acts as the base structure, the duct being adapted in use to form a breakwater.

11. A wave energy generator according to claim 1, wherein the duct includes a flow control segment intermediate the first and second segments, the flow control segment being configured to inhibit flow of the oscillating water column flowing within the duct.

12. A wave energy generator according to claim 1, further comprising:

a secondary duct in communication with the duct, wherein the secondary duct is shaped such that the combination of the duct and the secondary duct has a generally S-shaped construction.

13. A wave energy generator according to claim 12, wherein the secondary duct has a substantially vertical segment, an intermediate curved or angled section, and a substantially horizontal segment; wherein the substantially vertical segment defines an inlet opening and the substantially horizontal section defines an outlet to the atmosphere.

14. A wave energy generator according to claim 13, wherein an open area of the vertical segment of the secondary duct is smaller than an open area of the horizontal segment of the secondary duct to thereby effect acceleration of air flowing in from the atmosphere during an intake phase under the action of a falling wave.

15. A wave energy generator according to claim 12, wherein a turbine/generator unit is located within or adjacent to an outlet of the secondary duct.

16. A wave energy generator according to claim 12, wherein the duct itself acts as the base structure, the duct being adapted in use to form a breakwater.

17. A wave energy generator according to claim 15, wherein the oscillating water column produces a bi-directional airflow, the turbine being driven by the airflow in a unidirectional direction.

18. A wave energy generator according to claim 12, wherein the at least one duct is generally L-shaped having a first segment which forms a lower substantially horizontal limb of the at least one duct and a second segment which forms an upper substantially vertical limb of the at least one duct, wherein the at least one duct further includes a flow control segment intermediate the first and second segments, the flow control segment being configured to inhibit flow of the oscillating water column flowing within the at least one duct.

19. A wave energy generator according to claim 18, wherein the flow control segment has a substantially planar surface over which the water flows.

20. A wave energy generator according to claim 15, wherein a cross-sectional area of the duct varies in at least one region such that this region accelerates water flowing through that region of the duct, whereby a corresponding airflow reaches a desired velocity for passing through the turbine.

* * * * *